Figure 1:
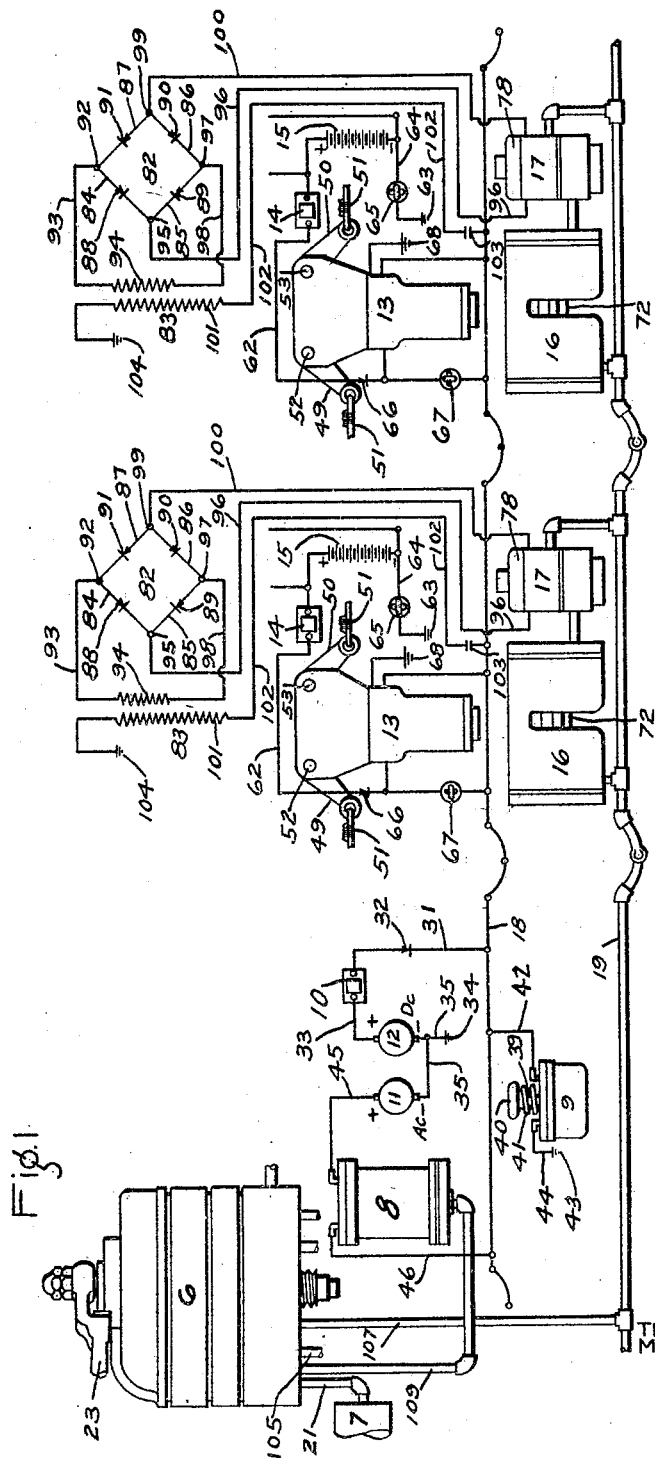

Nov. 24, 1931.    T. H. THOMAS    1,832,921
SIGNAL AND BRAKE SYSTEM
Filed Aug. 9, 1929    2 Sheets-Sheet 1

INVENTOR
THOMAS H. THOMAS DECEASED
MABEL M. THOMAS EXECUTRIX
BY
Wm. M. Cady
ATTORNEY

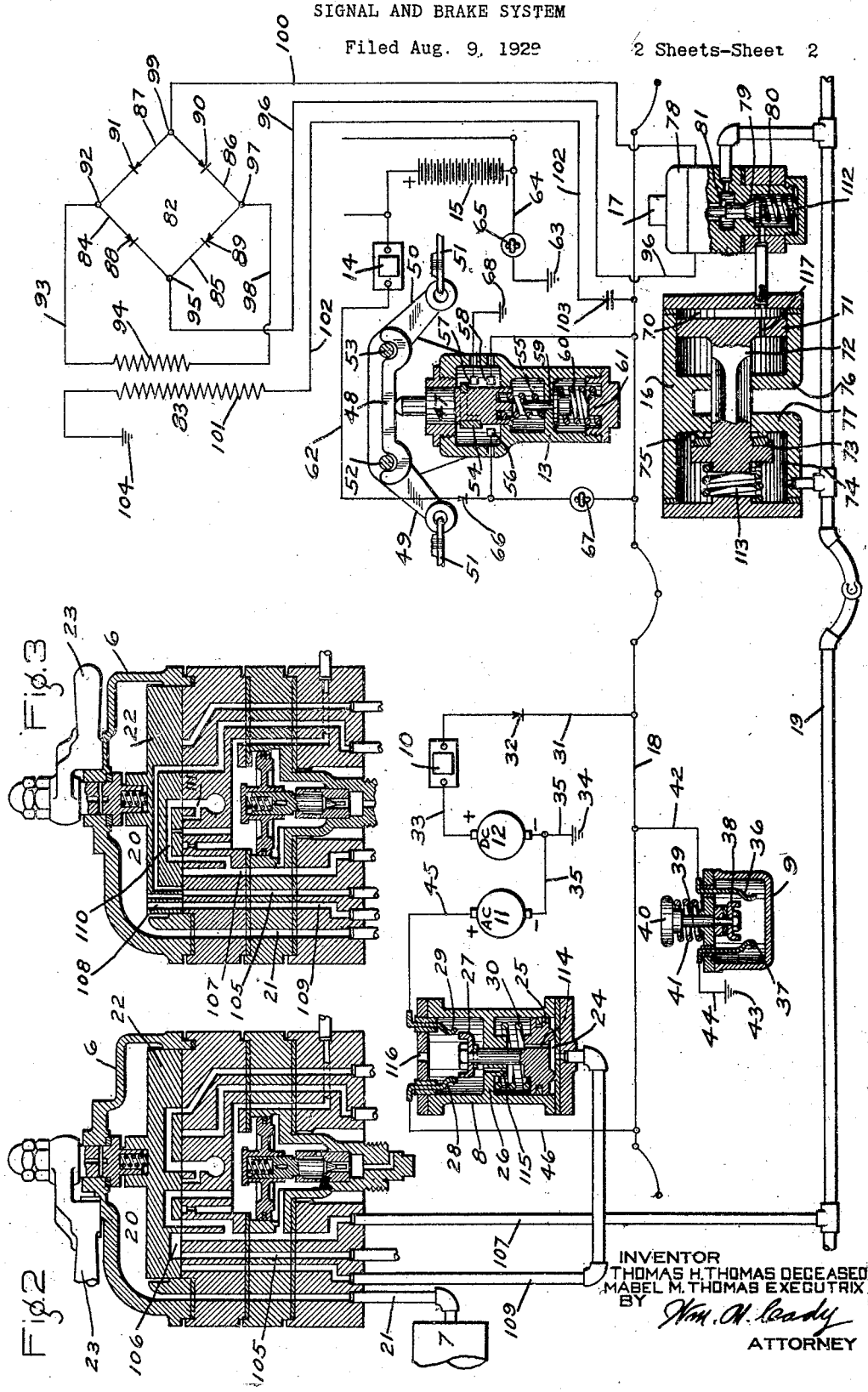

Patented Nov. 24, 1931

1,832,921

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SIGNAL AND BRAKE SYSTEM

Application filed August 9, 1929. Serial No. 384,659.

This invention relates to a combined fluid pressure brake and signal system which is controlled electrically and which is of the same general type as the system of Clyde C. Farmer, described and claimed in an application for United States Letters Patent, filed June 1, 1929, Serial No. 367,791.

In the above referred to application, direct current is employed for operating the signals on the train and alternating current is used for controlling the operation of the electromagnetically controlled brake devices. A single train wire is employed, and a condenser is interposed in each local brake device circuit for preventing the direct current from operating the electro-magnets of the brake devices when the direct current is impressed on the single train wire for operating the signals. With such an arrangement it is necessary to employ a large condenser, because the condensive reactance must be made small, since the inductive reactances of the windings on the magnets are small.

An object of the present invention is to provide a combined fluid pressure brake and signal system which is controlled electrically by alternating and direct current over a single train wire, and in which means are provided in each local brake device circuit for transforming the alternating current to direct current when the alternating current is impressed on the train wire.

Another object of the invention is to provide a combined fluid pressure brake and signal system in which the signal devices are controlled by direct current and in which alternating current is used for controlling the operation of the brake devices, means being provided for preventing the operation of the brake devices when the signal devices are being operated by the direct current, and means being provided in each local brake device circuit for transforming the alternating current to direct current.

Another object of the invention is to provide a combined fluid pressure brake and signal system in which the signal devices are adapted to be operated by direct current and in which the brake devices are adapted to be operated by alternating current, both the alternating current and the direct current being supplied to the said devices over a single train wire, the brake devices each having an electro-magnet valve device adapted to be energized by direct current, means being provided for preventing the energization of said electro-magnets when direct current is supplied over the train wire for operating the signals, and means being provided in each local electro-magnet circuit for transforming the alternating current to direct current for operating said electro-magnets when alternating current is impressed on the train wire.

Another object of the invention is to provide an improved combined fluid pressure brake and signal system of the character mentioned, which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings, Figure 1 is a diagrammatic view of a combined fluid pressure brake and signal system constructed according to the invention; Fig. 2 is a diagrammatic view of a portion of the structure shown in Fig. 1, on a larger scale and in section, the brake valve device being shown in release or running position; and Fig. 3 is a diagrammatic section of the brake valve device in emergency position.

Referring to the drawings, and especially to Fig. 1, the combined brake and signal system for the locomotive of a train may comprise a brake valve device 6, a main reservoir 7, a pneumatically operated emergency switch device 8, a signal switch device 9, an engineman's signal indicating device 10, and electric current supply sources 11 and 12, the source 11 being a generator for generating alternating current and the source 12 being a generator for generating direct current.

The equipment on each of the cars of the train may comprise a trainman's switch device 13, a signal indicating device 14, an electric current supply source 15 in the form of a storage battery for supplying direct current, a brake pipe vent valve device 16, and a magnet valve device 17.

Extending continuously through the length of the train is a single train wire 18 and also the usual brake pipe 19, said train wire and brake pipe being connected between the vehicles in the usual manner.

Referring now to Fig. 2, the brake valve device 6 may comprise a casing having a chamber 20 connected to the main reservoir 7 through a pipe and passage 21 and contains a rotary valve 22 which is adapted to be operated by a handle 23.

The emergency switch device 8 may comprise a casing having a chamber 24 containing a piston 25 having a stem which extends through, and is slidably guided in a wall 26 of the casing. Secured to the upper end of the piston stem, is a connector 27 which is adapted to engage with spring fingers 28 and 29 mounted in insulators secured in the casing. Interposed between, and engaging the piston 25 and the wall 26 of the casing, is a spring 30.

The signal indicating device 10 may be of the buzzer type and has one of its terminals connected to the train wire 18 by a wire 31 in which there is interposed a rectifier 32 adapted to permit current to flow therethrough only in the direction of the arrow. The other terminal of the signal indicating device is connected to the positive terminal of the direct current generator 12 by a wire 33. The negative terminal of the generator 12 is connected by a wire 35 to a ground 34.

The engineman's switch device 9 may comprise a casing having spring fingers 36 and 37 mounted therein which are adapted to be engaged by a connector 38 secured to a plunger 39 which is adapted to be operated in one direction through the medium of a foot button 40 and in the opposite direction by the pressure of a spring 41 interposed between the foot button and the casing. The spring finger 36 is connected to the train wire 18 by a wire 42, and the spring finger 37 is connected to ground at 43 by a wire 44.

The negative terminal of the alternating current generator 11 is connected to the ground 34 by the wire 35, and the positive terminal of said generator is connected to the spring finger 29 of the emergency switch device 8 by a wire 45, the spring finger 28 being connected to the train wire 18, by a wire 46.

The trainman's switch device 13 on each car of the train may comprise a casing which contains a plunger 47 adapted to be operated by a lever 48 having operating arms 49 and 50. Each arm has an operating cord 51 connected thereto.

Mounted on the casing are fulcrum pins 52 and 53, which are so disposed that when the arm 49 is operated, the lever 48 turns about the fulcrum pin 52 to operate the plunger 47 and when the arm 50 is operated, the lever turns about the fulcrum pin 53 to operate said member.

The plunger 47 is provided with a contact 54 and is normally maintained in the position shown in Fig. 2 by the pressure of a spring 55.

Arranged within the casing are contact terminals 56, 57 and 58, the contact 54 being adapted, at one time to connect the contact terminals 56 and 57 and, at another time, to connect the contact terminals 56 and 58.

When the plunger 47 is moved downwardly from its normal position to the position in which the contact 54 engages the contact terminals 56 and 57, the lower end of said member engages the upper end of a stop 59 which is slidably mounted in the casing and which is subject to the pressure of a spring 60. Further downward movement of the plunger 47 is now resisted by the pressure of the spring 60, and when the contact 54 connects the contact terminals 56 and 58, the stop 59 will come to rest against a stop 61 rigid with the casing.

The signal indicating device 14 may be of the buzzer type having one of its terminals connected to the train wire 18 by a wire 62 and its other terminal connected to the positive terminal of the battery 15. The negative terminal of the battery 15 is connected to ground at 63 by a wire 64, in which wire there is interposed a switch device 65. Interposed in the wire 62 is a rectifier 66, which permits current to flow therethrough only in the direction indicated by the arrow, and also interposed in the wire at a point between the train wire 18 and the rectifier 66 is a switch device 67.

The contact terminal 56 of the switch device 13 is connected to the wire 62 at a point between the rectifier 66 and the switch device 67. The contact terminal 57 is connected to ground at 68 and the contact terminal 58 is connected to the train wire 18.

The vent valve device 16 may comprise a casing having a chamber 70 containing a piston 71 having a fluted stem 72 which is provided with a valve 73 contained in a chamber 74 connected to the brake pipe 19, said valve being adapted to seal against a seat ring 75 formed in the casing. The fluted stem 72 extends through openings in the spaced walls 76 and 77 of the casing, the space between the walls being open to atmosphere.

The magnet valve device 17 may comprise a magnet 78 and a valve 79 operated by said magnet, said valve being contained in a chamber 80 which is connected to the piston chamber 70 in the vent valve device 16. The valve 79 is operative to control communication from a chamber 81 to the chamber 80, said chamber 81 being connected to the brake pipe 19.

The means for controlling the magnet valve device 17 in the present instance is shown as comprising a full wave rectifier device 82 which is interposed in a circuit between a transformer 83 and the magnet 78 so that when alternating current is impressed on the train wire 18 when the brake valve device is actuated in the manner to be described to effect an emergency application of the brakes, a continuous flow of direct current flows through the coil of said magnet.

The rectifier device 82 comprises four units, indicated at 84, 85, 86 and 87. Each unit comprises a wire in which there is interposed a rectifier adapted to permit current to flow therethrough only in the direction of the arrow.

Thus a rectifier 88 is interposed in the wire 84, and rectifiers 89, 90 and 91 are interposed in the wires 85, 86 and 87 respectively.

The adjoining ends of the wires 84 and 87 are connected to a terminal 92, to which is also connected a wire 93 from one terminal of the secondary coil 94 of the transformer 83.

The adjoining ends of the wires 84 and 85 are connected to a terminal 95, to which is also connected a wire 96 from one terminal of the magnet 78.

The adjoining ends of the wires 85 and 86 are connected to a terminal 97, to which is also connected a wire 98 from the other terminal of the secondary coil 94 of the transformer 83.

The adjoining ends of the wires 86 and 87 are connected to a terminal 99, to which is also connected a wire 100 from the other terminal of the magnet 78.

One terminal of the primary coil 101 of the transformer 83 is connected to the train wire 18 by a wire 102 which has interposed therein a condenser 103, which is adapted to prevent the flow of direct current through the transformer 83. The other terminal of the primary coil 101 is connected to ground at 104.

With the brake valve device 6 in running position, as shown in Figs. 1 and 2, the brake pipe 19 is supplied with fluid under pressure from the usual feed valve device (not shown) through a pipe and passage 105, cavity 106 in the rotary valve 22 of the brake valve device, and passage and pipe 107. Fluid thus supplied to the brake pipe 19 flows to the valve chamber 74 in the vent valve device 16 and to the chamber 81 in the magnet valve device 17.

Assuming the switch devices 65 and 67 to be in their circuit closing positions, and the engineman desires to signal the trainman, the engineman depresses the foot button 40 of the switch device 9 a sufficient distance that the connector 38 connects the spring fingers 36 and 37, thus grounding the train wire 18 so that current from the battery 15 will flow through the signal indicating device 14 and cause said device to operate to sound the signal initiated by the engineman. Since the train wire is grounded, current generated by the generator 12 will flow through the signal indicating device 10 on the locomotive and cause said device to operate.

Should the trainman desire to signal the engineman, the trainman operates the lever 48 of the switch device 13 to move the contact 54 into connecting engagement with the contact terminals 56 and 57, thus closing the circuit through the engineman's signal indicating device 10 and also through the signal indicating device 14, so that both devices will operate to sound the signal initiated by the trainman.

Should the switch device 67 be in position to open the circuit through the signal indicating device 14 to the train wire 18, and the trainman desires to receive a signal from the engineman, the trainman operates the switch device 13 so that the contact 54 connects the contact terminals 56 and 58, so that, when the engineman operates the switch device 9 to connect the train wire 18 to ground 43 the circuit through the signal indicating device 14 will be completed as will the circuit through the signal indicating device 10 and both signals will operate to sound the signal from the engineman.

It will here be noted that in signalling on the train, the rectifiers 32 and 66 prevent the flow of current from one source of current to the other, so that if one source of current is of greater voltage than the other, no damage can be done to the source having the lowest voltage. Current supplied to the train wire 18 from the battery 15 and direct current generator 12 will not pass through the condenser 103 so that the magnet 78 of the magnet valve device 17 will not be energized.

When the brake valve device 6 is operated to emergency position, as shown in Fig. 3, fluid under pressure from the main reservoir 7 is supplied to the piston chamber 24 of the emergency switch device 8 through pipe and passage 21, chamber 20 in the brake valve device, port 108 in the rotary valve 22 and passage and pipe 109. With the brake valve device in this position the brake pipe 19 is vented to the atmosphere in the usual manner through pipe and passage 107, cavity 110 in the rotary valve 22 and passage 111.

Fluid under pressure supplied to the chamber 24 causes the emergency switch piston 25 to move upwardly against the pressure of spring 30, operating the connector 27 into contact with the spring fingers 28 and 29, thus closing the circuit through the alternating current generator 11, transformer 83, rectifier device 82, and magnet 78.

With the circuit thus closed, alternating current generated by the generator 11 flows through coil 101 of the transformer 83. This induces a similar alternating current in coil 94.

The rectifier units of the rectifier device 82 have properties such that they have a very high resistance to flow of current in an opposite direction to the arrows and a comparatively low resistance to the flow of current in the direction of the arrows.

When the current flows through coil 94 in an upward direction it will flow through the rectifier unit 84 in the direction of the arrow, through wire 96 to the magnet 78, through wire 100 to rectifier unit 86 and back to the coil 94, thus completing the circuit.

When the current is flowing in a downward direction through the coil 94, the current will flow through rectifier unit 85 in the direction of the arrow, through the magnet 78 and rectifier unit 87 back to coil 94, thus completing the circuit.

Therefore, no matter which direction current is flowing through coil 94, the current will always flow in only one direction through the coil of the emergency magnet 78, and said magnet is thereby energized.

With the magnet 78 thus energized, valve 79 is unseated against the pressure of spring 112 contained in valve chamber 80, thus establishing communication through which fluid under pressure in the chamber 81 supplied from the brake pipe 19, flows to the valve chamber 80 and thence to the piston chamber 70 in the vent valve device 16.

The pressure of fluid thus supplied to the chamber 70 causes the vent valve piston 71 to move toward the left against the pressure of spring 113 contained in valve chamber 74, unseating the valve 73 from the seat ring 75.

With the valve 73 unseated, fluid under pressure from the brake pipe 19 is released to the atmosphere by way of valve chamber 74, past the unseated valve 73 and around the fluted stem 72.

When each car of a train is provided with a magnet valve device 17 and a vent valve device 16, these devices throughout the length of the train, will operate simultaneously and thus cause all of the usual triple valve devices (not shown) to operate to emergency positions to effect an emergency application of the brakes substantially simultaneously on each car.

When the rear car only of a train is provided with a magnet valve device 17 and a vent valve device 16, fluid under pressure will be vented from the brake pipe 19 at the rear of the train at the same time as the brake pipe is vented at the front end of the train through the brake valve device 6, thus causing all of the triple valve devices on the train to operate promptly to effect an emergency application of the brakes.

In the present embodiment of the invention there are no means provided in the brake valve device 6 for venting the piston chamber 24 in the emergency switch device 8 when the brake valve device 6 is in release or running position, but this chamber is vented to the atmosphere through a port 114 through the piston 25, passage 115 through the wall 26 of the casing and atmospheric passage 116.

When the brake valve device 6 is operated to release position to release the brakes after an emergency application, and the piston chamber 24 in the emergency switch device 8 is vented to the atmosphere as just described, the pressure of the spring 30 moves the piston 25 to its lowermost position, causing the connector 27 to be moved out of contact with the spring fingers 28 and 29, thus opening the electric circuit through the magnet 78 of the magnet valve device 17, thus deenergizing said magnet.

With the magnet 78 thus deenergized, the pressure of the spring 112 causes the valve 79 to seat, thereby cutting off the further supply of fluid under pressure from the brake pipe 19 to the chamber 70 in the vent valve device 16 when said brake pipe is being recharged.

When the pressure in the brake pipe 19 has been reduced to a predetermined degree, the pressure of the spring 113 of the vent valve device 16 causes the valve 73 to seal against the seat ring 75, thus closing communication from the brake pipe 19 to the atmosphere through the vent valve device.

If at any time there is fluid under pressure in the piston chamber 70 when the valve 79 of the magnet valve device 17 is seated, such fluid will be discharged to the atmosphere through a port 117 through the piston 71 and around the fluted stem 72.

Preferably the coil 101 of the transformer 83 is made so that its inductive reactance is numerically equal to the condensive reactance of the condenser 103 so as to produce a resonant circuit and prevent a large voltage drop across the combined condenser and transformer. This permits the use of a much smaller condenser than can be used with the prior systems where the condensive reactance must be made small, since the inductive reactance of the windings on the emergency magnets is small. In this way the cost and weight of the equipment is reduced to a minimum.

While one illustrative embodiment of the invention has been described in detail, it is not the intention to limit its scope to that embodiment or otherwise than by the terms of the appended claims.

Having now described the invention, what is claimed as new and desired to be secured by Letters Patent is:

1. In a combined fluid pressure brake and signal system, the combination with a brake pipe and a train wire, of a brake valve device operative to vent fluid under pressure from said brake pipe to effect an application of the brakes, a plurality of valve devices operative to locally vent fluid under pressure from said brake pipe, a plurality of electrically controlled signal indicating devices, each connected to said train wire, a source of alternating current, a plurality of sources of direct current, switch means operative to connect said sources of direct current to said train wire to operate said signal devices, a magnet valve device for controlling each of said vent valve devices, the magnets of said magnet valve devices being operative only by direct current, a switch device operative upon the operation of said brake valve device to connect the source of alternating current to the train wire, means for transforming the alternating current to direct current for energizing said magnets, and means for preventing direct current from the sources of direct current from passing through said transforming means so that said magnets are not energized by current from the sources of direct current when the signal indicating devices are operated.

2. In a combined fluid pressure brake and signal system, the combination with a brake pipe and a train wire, of a brake valve device operative to vent fluid under pressure from said brake pipe to effect an application of the brakes, a valve device operative to locally vent fluid under pressure from said brake pipe, an electrically controlled signal indicating device connected to said train wire, a source of alternating current, a source of direct current, switch means operative to connect said source of direct current to said train wire to operate said signal device, a magnet valve device for controlling said vent valve device, the magnet of said magnet valve device being operative only by direct current, a switch device operative by fluid pressure upon the operation of said brake valve device to connect the source of alternating current to the train wire, means for transforming the alternating current to direct current for energizing the magnet of said magnet valve device, and means for preventing current from said source of direct current from passing through said transforming means so that said magnet is not energized by direct current from the source of direct current when the signal indicating device is operated.

3. In a combined fluid pressure brake and signal system for railway trains, the combination with a brake pipe and a train wire, of a brake valve device on the head vehicle of a train operative to vent fluid under pressure from said brake pipe to effect an application of the brakes, a valve device on each of the other vehicles of the train operative to locally vent fluid under pressure from said brake pipe, an electrically controlled signal indicating device on the head vehicle and an electrically controlled signal indicating device on each of the other vehicles and each connected to said train wire, a source of alternating current and a source of direct current on the head vehicle, a source of direct current on each of the other vehicles, switch means on the head vehicle operative to connect said source of direct current to said train wire to operate said signal devices, switch means on each of the other vehicles of the train operative to connect said sources of direct current to said train wire to operate said signal devices, a magnet valve device for controlling each of said local brake pipe vent valve devices, the magnet of said magnet valve device being operative only by direct current, a switch device on the head vehicle of the train operative to connect the source of alternating current to the train wire, means on each of the other vehicles of the train for transforming the alternating current to direct current for energizing the magnets of said magnet valve devices, and means on each of the other vehicles for preventing current from said sources of direct current from passing through said transforming means when said signal indicating devices are operated.

4. In a combined fluid pressure brake and signal system for railway trains, the combination with a brake pipe and a train wire, of a brake valve device on the head vehicle of a train operative to vent fluid under pressure from said brake pipe to effect an application of the brakes, a valve device on each of the other vehicles of the train operative to locally vent fluid under pressure from said brake pipe, an electrically controlled signal indicating device on the head vehicle and an electrically controlled signal indicating device on each of the other vehicles and each connected to said train wire, a source of alternating current and a source of direct current on the head vehicle, a source of direct current on each of the other vehicles, switch means on the head vehicle operative to connect said source of direct current to said train wire to operate said signal devices, switch means on each of said other vehicles operative to connect the local source of direct current to said train wire to operate said signal devices, a magnet valve device for controlling each of said vent valve devices, the magnets of said magnet valve devices being operative only by direct current, means for preventing direct current from said sources of direct current from energizing said magnets when the signal indicating devices are operated, a switch device on the head vehicle of the train operative to connect the source of alternating current to the train wire when the brake valve device is operated to effect an application of the brakes, and means on each of the other vehicles of the train for transforming the alternating current to direct current for energizing the magnets of said magnet valve devices.

In testimony whereof I have hereunto set my hand.

MABLE M. THOMAS,
*Executrix of the Last Will and Testament of Thomas H. Thomas, Deceased.*